United States Patent
Commons et al.

(10) Patent No.: US 7,305,694 B2
(45) Date of Patent: Dec. 4, 2007

(54) METHOD AND APPARATUS FOR REMOTELY CONTROLLING A RECEIVER ACCORDING TO CONTENT AND USER SELECTION

(75) Inventors: Christopher Commons, Carmel, IN (US); Marty R. Wachter, Phoenix, MD (US); Robert A. Bouterse, Danville, IN (US)

(73) Assignee: Digital Networks North America, Inc., Cupertino, CA (US)

( * ) Notice: Subject to any disclaimer, the term of this patent is extended or adjusted under 35 U.S.C. 154(b) by 0 days.

(21) Appl. No.: 10/935,068

(22) Filed: Sep. 7, 2004

(65) Prior Publication Data

US 2005/0100312 A1 May 12, 2005

Related U.S. Application Data

(60) Provisional application No. 60/500,582, filed on Sep. 4, 2003.

(51) Int. Cl.
*H04N 7/18* (2006.01)

(52) U.S. Cl. .............................. 725/80; 725/82; 725/85; 725/133; 725/141; 725/153; 700/94; 348/706; 348/554; 348/555; 381/56; 715/716; 715/717; 715/727; 715/728

(58) Field of Classification Search ............ 725/39–40, 725/43–44, 48, 52, 53, 59, 80, 82, 85, 131, 725/133–134, 139, 141, 151, 153; 348/706, 348/554–555; 700/94; 381/56; 715/716–717, 715/727, 728
See application file for complete search history.

(56) References Cited

U.S. PATENT DOCUMENTS 5,751,672 A 5/1998 Yankowski .................. 709/238
5,768,224 A * 6/1998 Tanaka et al. .................. 369/2

(Continued)

FOREIGN PATENT DOCUMENTS

EP 0910088 A2 9/1998

(Continued)

OTHER PUBLICATIONS

U.S. Appl No. 09/453,023, filed Dec. 2, 1999, entitled Apparatus, Method and Database for Control of Audio/Video Equipment.

(Continued)

*Primary Examiner*—Jason Salce
(74) *Attorney, Agent, or Firm*—McDonnell Boehnen Hulbert & Berghoff

(57) ABSTRACT

System and method for automatically controlling a media receiver by instructing the media receiver to use a particular receiver connection and to play a selected media unit using one of a plurality of play modes according to characteristics of the media unit. Media units may be encoded using any of a variety of encoding formats. The media management system may interface with a media receiver to select media receiver connections in accordance with the media type of the media unit. The media management system may also interface with the media receiver to set media receiver settings for playing the selected media unit according to the media receiver settings selected for a play mode corresponding to the characteristics of the selected media unit.

29 Claims, 3 Drawing Sheets

U.S. PATENT DOCUMENTS

| | | | |
|---|---|---|---|
| 5,915,026 A | | 6/1999 | Mankovitz .................. 713/168 |
| 5,945,988 A | * | 8/1999 | Williams et al. ............ 715/747 |
| 5,987,525 A | | 11/1999 | Roberts et al. ............. 709/248 |
| 6,038,614 A | * | 3/2000 | Chan et al. ..................... 710/1 |
| 6,154,773 A | | 11/2000 | Roberts et al. ............. 709/219 |
| 6,304,523 B1 | | 10/2001 | Jones et al. ............... 707/104.1 |
| 6,359,636 B1 | * | 3/2002 | Schindler et al. ........... 715/846 |
| 6,469,633 B1 | | 10/2002 | Wachter ................ 340/825.69 |
| 6,542,882 B1 | * | 4/2003 | Smith .......................... 706/46 |
| 2001/0005903 A1 | * | 6/2001 | Goldschmidt Iki et al. ... 725/50 |
| 2003/0078687 A1 | * | 4/2003 | du Breuil ..................... 700/94 |
| 2003/0177148 A1 | * | 9/2003 | Fujishita ..................... 707/203 |
| 2004/0049791 A1 | | 3/2004 | Shah et al. ................... 725/82 |
| 2004/0057582 A1 | * | 3/2004 | Fukuda ....................... 380/277 |

FOREIGN PATENT DOCUMENTS

| | | |
|---|---|---|
| WO | WO 99/63969 | 12/1999 |
| WO | WO 99/64969 | 12/1999 |

OTHER PUBLICATIONS

Office Action from U.S. Appl. No. 09/453,023, dated Nov. 30, 2004.

Notification of Transmittal of the International Search Report and the Written Opinion of the International Searching Authority (Form PCT/ISA/220), for International Application No. PCT/US04/28910—dated Aug. 9, 2005.

International Search Report (Form PCT/ISA/210) for International Application No. PCT/US04/28910—dated Aug. 9, 2005.

Written Opinion of the International Searching Authority (Form PCT/ISA/237) for International Application No. PCT/US04/28910—dated Aug. 9, 2005.

Supplementary European Search Report, European Patent Office, completion date of the report Mar. 26, 2007.

Wickelgren, Ingrid J., "The facts about firewire," Apr. 1997, pp. 19-25, IEEE Spectrum, IEEE Inc., New York, United States.

"The HaVi Architecture, Version 0.8," HaVi Architecture, No. 8, HaVi specification XP-002089719, May 15, 1998, pp. 6-18.

Supplementary European Search Report, European Patent Office, Feb. 6, 2007.

Secrets of Home Theater and High Fidelity, vol. 1, No. 1, 1994, Section 3. VCRs (Revised Jun. 2000), downloaded from the world wide web at http://www.hometheaterhifi.com/volume_1_1/v1n1vcrs.html on Feb. 21, 2007.

David Ranada, Test Reports—Pasasonic LX-H170 CD/Laserdisc Player, Stereo Review May 1995, downloaded from the world wide web at http://www.laserdiscarchive.co.uk/laserdisc_archive/panasonic/panasonic_lx-h170/panasonic_lx-h170.htm on Feb. 22, 2007.

* cited by examiner

METHOD AND APPARATUS FOR REMOTELY CONTROLLING A RECEIVER ACCORDING TO CONTENT AND USER SELECTION

CROSS REFERENCE TO RELATED APPLICATION

This application claims the benefit of U.S. Provisional Application No. 60/500,582, filed on Sep. 4, 2003, entitled "Method and Apparatus for Remotely Controlling a Receiver according to Content and User Selection," which is incorporated herein by reference.

FIELD OF INVENTION

The current invention relates to entertainment devices and, more specifically, to systems and methods for automatic control over peripheral equipment connected to media management systems.

BACKGROUND

Media management systems are becoming increasingly popular among consumers of entertainment media who need assistance in managing their ever-growing collections of CD's, DVD's, MP3 files and media-playing equipment. Media management systems interface with a variety of sources of media. For example, a media management system may receive media from different CD-changers, different DVD-changers, the Internet, a CD player, a DVD player, a personal computer and a hard disk drive. Media management systems also interface with a variety of media players. For example, the same media management system may play media on a monitor, a television, and on different audio receivers. Media management systems are also typically able to display information about the media available on the connected sources of media on a user interface. The user interface allows the user to communicate instructions to play selected pieces of media.

Developers of media management systems aim to interface with as wide a variety of media sources as possible. Different media sources make media available in forms that provide different capabilities for enhancing the user experience. Web-sites on the Internet offer users the convenience of downloading music or other audio as MP3 files. Video works and music are now available on different types of discs such as DVD, CD, Super-Audio CD (SACD), WAV, MP3, DVD-Audio, etc. offering the user options such as choices in surround modes available to the user. In this regard, audio/video receivers now have a variety of inputs to allow a user to connect alternative media sources. A user may connect media sources, audio receivers and video players to a media management system to take advantage of the many options available to experience the media.

Providing such variety of capabilities imposes on the user the burden of learning and understanding the capabilities available on the user's media management system. Moreover, the user typically manually configures the manner in which a selected piece of media will be played each time it is played. For example, a user may direct an SACD disc to a 6-channel analog input on the receiver when playing an SACD disc. Then, if the user wishes to listen to an MP3 file, the user may manually configure the media management system to direct the output to a 2-channel input on the receiver. Such manual configuration for each type of media source becomes burdensome to the user.

Based on the foregoing, a need exists for automatically configuring receivers to play media using sound and video modes according to characteristics of the media.

SUMMARY

In one respect, an exemplary embodiment of the present invention may take the form of an apparatus for controlling a media receiver. The apparatus comprises (i) a media player interface, (ii) a media database, (iii) a play selection system, and (iv) a media play processor. The media player interface includes a plurality of receiver connections. Each receiver connection is operable to communicate with the media receiver. The media database includes a plurality of media unit records. Each media unit record identifies one of a plurality of media units by one or more characteristics. A first characteristic of each media unit record identifies one media type of a plurality of media types. The play selection system (i) retrieves a media unit record from the media database for a selected media unit, (ii) determines a media type of the selected media unit from the media unit record, and (iii) communicates, to a media play processor, a receiver connection selection for the selected media unit based on the media type of the selected media unit. The media play processor configures the media receiver, and couples the selected media unit to a selected receiver connection, according to the receiver connection selection.

In another respect, an exemplary embodiment of the present invention may take the form of an apparatus for controlling a media receiver. The apparatus comprises (i) a media player interface, (ii) a media database, (iii) a play selection system, and (iv) a media play processor. The media player interface includes a plurality of receiver connections. Each receiver connection is operable to communicate with the media receiver. The media database includes a play mode record, and a plurality of media unit records. Each media unit record identifies one of a plurality of media units by one or more characteristics. A first characteristic of each media unit record identifies a characteristic selected from the group consisting of: title, song, genre, location, label, artist, media type, and date. The play mode record identifies one of a plurality of play modes corresponding to the first characteristic. The play selection system (i) retrieves the play mode record from the media database, (ii) retrieves a media unit record from the media database for a selected media unit, (iii) determines the first characteristic of the selected media unit from the media unit record, and (iv) communicates, to a media play processor, a play mode selection for the selected media unit based on at least the first characteristic and the play mode record. The media play processor requests the media receiver to play the selected media unit according to the play mode selection.

In yet another respect, an exemplary embodiment of the present invention may take the form of a method for controlling a receiver. The method includes (i) retrieving a media unit record for a media unit selected to be played by a receiver coupled to a media player interface, wherein the media unit record identifies a media type for the media unit, (ii) retrieving a media type configuration record, wherein the media type configuration record identifies one of a plurality of receiver connections corresponding to the media type, and (iii) requesting the receiver to use the one of a plurality of receiver connections to receive the media unit for play by the receiver.

In still yet another respect, an exemplary embodiment of the present invention may take the form of a media management system that includes (i) a plurality of media source input/output (I/O) ports coupled to a plurality of media sources, (ii) a user interface coupled to at least one user interface device, the user interface operable to receive at least one media play instruction from a user, (iii) a media player interface comprising a plurality of receiver connections, each communicatively coupled to a media receiver, (iv) a media data base, (v) a play selection system, and (vi) a media play processor. The media database includes a plurality of media unit records, a media type configuration record, a play mode record, and a media receiver type record that identifies the media receiver. Each media unit record identifies (a) one of a plurality of media units by a characteristic that corresponds to one of a plurality of play modes identified in the play mode record, and (b) a media type that corresponds to one of a plurality of receiver connections identified in the media type configuration record. The play selection system (i) retrieves a media unit record for a selected media unit to be played by the media receiver, the media type configuration record, the play inode record, and the media receiver type record, (ii) determines a play mode for the selected media unit from the media unit record and the play mode record, (iii) determines a receiver connection selection based on the media type, the media type configuration record, and the media receiver type record, and (iv) communicates, to a media player processor, the receiver connection selection and the play mode for the selected media unit. The media play processor (i) configures the media receiver, and (ii) couples the selected media unit to a selected receiver connection, according to the receiver connection selection.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

1. Overview

Figure 1:
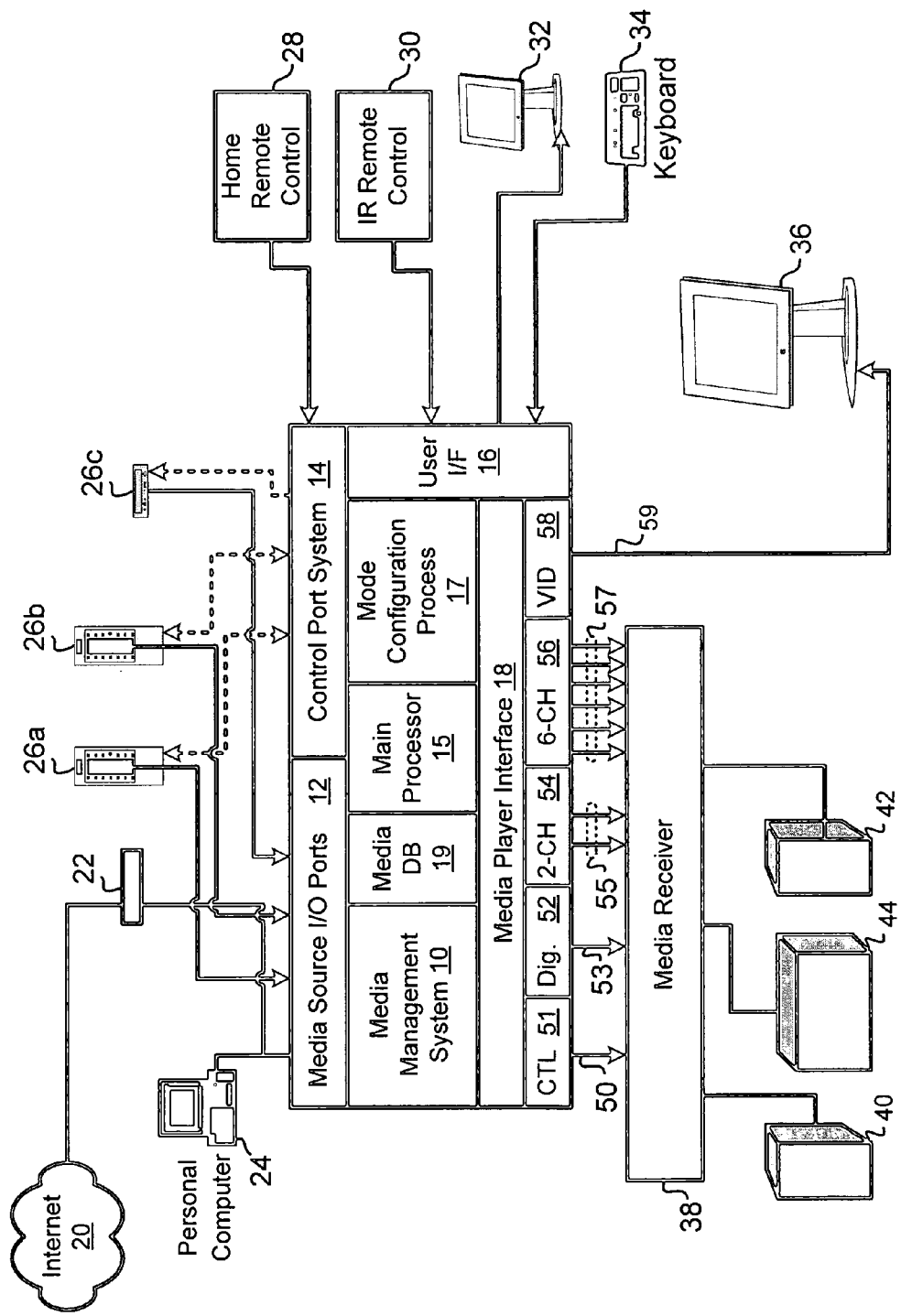
FIG. 1 is a block diagram illustrating an exemplary media management system.

FIG. 1 is a block diagram of an exemplary media management system 10 that includes:
(i) a plurality of media source input/output (I/O) ports 12, (ii) a control port system 14, (iii) a main processor 15, (iv) a user interface 16, (v) a mode configuration process 17, (vi) a media player interface 18, (vii) a media database 19, (viii) a control signal connection 51, (ix) a digital connection 52, (x) a 2-channel audio connection 54, (xi) a 6-channel audio connection 56, and (xii) a video connection 58.

The control signal connection 51, the digital connection 52, the 2-channel analog connection 54, the 6-channel analog connection 56, and the video connection 58 are communicatively coupled to a media receiver 38. The media receiver 38 may be configured in various arrangements. For example, the media receiver 38 may comprise a pre-amplifier. As another example, the media receiver 38 may include a pre-amplifier and a decoder that decodes media for playing the media in one of a variety of play modes. As yet another example, the media receiver 38 may comprise a pre-amplifier and an amplifier. As still yet another example, the media receiver 38 may include a pre-amplifier, an amplifier, and a radio frequency tuner. Other examples of media receiver arrangements are also possible.

The main processor 15 could comprise one or more processors, such as a general purpose processor and/or a digital signal processor. The main processor 15 executes program instructions in order to work cooperatively with the plurality of media source I/O ports 12, the control port system 14, the user interface 16, the mode configuration process 17, and the media player interface 18.

The plurality of media source I/O ports 12 are coupled to a plurality of media source devices or systems. By way of example, the plurality of devices or systems may include the Internet 20, a personal computer 24, a first disc changer 26a, a second disc changer 26b, and a third disc changer 26c. Other examples of the devices or systems coupled to the plurality of media source I/O ports 12 are also possible.

The Internet 20 is preferably connected to a network hub 22, which provides Internet access to the personal computer 24 in a local area network environment. The personal computer 24 may connect to the media management system 10 using any suitable data connection (e.g. RS232, Ethernet, wireless Ethernet, etc.). In a preferred embodiment, the personal computer 24 connects to the media management system 10 at an Ethernet connection over which the media management system 10 connects to the Internet 20.

The first, second and third disc changers 26a-c may be any disc changer operable to hold a plurality of media discs such as audio CDs (compact discs), Super Audio CD's (SACD), and DVD's (digital versatile disc or digital video disc). The disc changers 26a-c connect to the media management system 10 at the media source I/O ports 12 to communicate media to the media management system 10.

The media management system 10 may include a control port system 14 for controlling the disc changers 26a-c. The control port system 14 may provide control signals to disc changers 26a-c via infrared (IR) (e.g. wired IR or wireless IR), or serial connections (e.g. two-way serial or S-Link based connections). Other examples of control signal types provided by the control port system 14 to the disc changers 26a-c are also possible.

The control port system 14 may interface (e.g. via an RS-232 serial cable) with a home remote control system 28. As an example, the home remote control system 28 may provide control for the media management system 10, as well as control for other systems, such as appliances and/or a furnace in a home.

The media management system 10 accesses each of the plurality of media sources and organizes information about the media that is accessible to the user of the media management system 10 in the media database 19. The media database 19 may be any type of storage system. For example, the media database 19 may comprise a disc-based mass storage device, a flash memory system, or a combination of flash memory and disc-based memory. The media database 19 stores media unit records, i.e., records containing information about media units that may be received from the media sources. As used herein, the term media unit shall refer to any playable or renderable piece of media, such as a song, a movie, a picture, a track on a disc, a portion of audio/visual programming, or any other audio and/or video segment.

In exemplary embodiments, a media unit record contains infonnation in the form of characteristics such as a title (e.g. a CD title, a DVD title, or a movie title), a song, a genre, a location, a label, an artist, a date, and/or a media type. The location defines the location of the media unit on the media source. For example, a media unit record for a song may denote that the song is located in a particular slot on a particular tray in a particular one of the CD changers that may be connected as a media source to the media management system 10. As another example, a media unit record for a song may denote that the song is located as a particular track on a disc, such as a CD, DVD, and or SACD. An artist defines a perfonrier's work or group of performers'work recorded as a media unit. A date, for example, may define the day which a media unit was recorded or a day the media unit was released by a recording studio. Other examples of the date are also possible.

The media type defines the format used to encode a media unit. Various media types are available for encoding audio. For example, a media type may include the Motion Picture Experts Group—audio layer 3 (MP3) format, a CD format, a SACD format, a DVD format(e.g., DVD-audio or DVD-movie), a wavefonn audio (WAV) format, pulse code modulation (PCM) format, free lossless audio code (FLAC) format, or an advance audio coding (AAC) format. The media type may also define whether the media unit is encoded as (i) encrypted or unencrypted media, or (ii) compressed or uncompressed media. Other examples of formats for digitally encoding audio are also possible.

Further, a media type format may have a variety of encoding characteristics. For example, an audio recording may be encoded as an MP3 file in mono format having a data rate of 96K bits per second (bps), or as an MP3 file in stereo format having a data rate of 96K bps, or as an MP3 file in stereo format having a data rate of 192K bps. As another example, the AAC format could be encoded using a variable bit rate or a constant bit rate and with a different amount of audio channels, (e.g. 1 channel, 2 channels, etc.). Other examples of encoding characteristics of the MP3 format, the AAC format, or other media type are also possible.

The media management system 10 may display selected information about the media from the media unit records stored in the media database 19 on a display 32. The media management system 10 may also allow the user to configure and select media to play using a keyboard 34, an IR remote control 30 or another suitable input device. The media management system 10 may include a user interface 16 that processes user input and output via the display 32 and the keyboard 34 and provides configuration and execution processes to allow the user to manage and play the media obtained from the media sources. As an example, the display 32 may comprise a touch-screen that allows a user to (i) configure and select media, and (ii) select play modes, by touching the touch-screen while a configuration and selection screen is shown on the display 32.

In a preferred embodiment, the user interface 16 may be coupled to a configuration process 17 that allows the user to configure the media receiver 38 to play the media in accordance with requirements specified in a play mode. The configuration process 17 may display screens to query the user prompting the user to enter information about play modes for the particular media types available.

For example, the query may be displayed on a display terminal. For instance, a querying function may include querying a user to select a play mode of a plurality of play modes to correspond with one of a plurality of characteristics identified in a media unit record, continuing to query the user to select play modes until each of the plurality of characteristics corresponds with one of the plurality of play modes, and storing the selected play modes corresponding to the plurality of characteristics in the play mode record. As another example, the querying function may include querying a user to select one of a plurality of receiver connections corresponding to one of a plurality of media types, and then continuing to query the user to select the receiver connections until each media type of the plurality of media types corresponds to a selected receiver connection.

As an example, the user may specify that a song in an MP3 format will be played on a receiver via a 2-channel analog connection. In this regard, for 2-channel analog, the media management system 10 processes the MP3 song by extracting the left and right channel analog signals of the MP3 song and then sends the left and right analog signals 55 to a corresponding 2-channel analog connection at the media receiver 38. The media receiver 38 may process the left and right channel signals 55 by amplifying the signals before outputting the signals to a left speaker and a right speaker respectively.

As another example, the MP3 song may also be communicated digitally (in MP3 or other digital format) to another digital player. In this regard, the user may specify a receiver connection that sends a digital signal 53 from the digital connection 52 to a corresponding digital connection at the media receiver 38. As yet another example, the user may specify a receiver connection that sends 6-channel audio signals 57 from the 6-channel audio connection 56 to a corresponding 6-channel audio connection at the media receiver 38.

The 2-channel analog receiver connection is only one of many media receiver connections that may be specified for a given media type. Other examples of media receiver connections include: (i) 5.1 analog connections, and (ii) digital connections, such as a 2-channel digital connection, a 5-channel digital connection, or a 7-channel digital connections. Other examples of media receiver connections are also possible. These media receiver connections may correspond directly to the connections available on the media receiver 38. FIG. 1 shows a digital connection 52, a 2-channel analog connection 54, and a 6-channel audio connection (e.g. for use with 5.1 modes) 56.

Audio signals received at the media receiver 38 may be played through one or more speakers coupled to the media receiver. As an example, the media receiver 38 is shown connected to a first speaker 40 (e.g. a speaker for a left-audio channel), a second speaker 42 (e.g. a right-channel speaker), and a third speaker 44 (e.g. a speaker for a center-audio channel). Other examples of the amount of speakers coupled to the media receiver 38 and/or the audio signal played through a particular speaker are also possible.

The media receiver 38 may also drive video equipment, such as a television or monitor 36 via a video connection 58. In this regard, a video signal 59 is sent to the television or monitor 36. The video formats may include compressed media (video and/or audio content), uncompressed media, or a combination of compressed and uncompressed media.

Examples of video formats include: (i) Motion Picture Experts Group (MPEG)-1, (ii) MPEG-2, (iii) MPEG-4, (iv) high definition television (HDTV), (v) National Television System Committee (NTSC), (vi) Phase Alternating Line (PAL), (vii) Joint Photographic Experts Group (JPEG), and (viii) Video-CD. Other examples of video formats are also possible.

The media receiver 38 may also use play modes specific for different video formats as well. For example, a Denon receiver may be commanded to configure the receiver according to special play modes that the receiver is designed to understand. The media management system 10 may send commands specifying play modes, such as (i) Digital Theater System (DTS) (e.g. DTS-ES, DTS-Neo:6, DTS-Digital Surround, or DTS-96/24), (ii) Dolby Pro Logic (DPL) (e.g. DPL II, DPL Movie, or DPL Music), (iii) Dolby Digital (e.g. Dolby Digital EX) (iv) THX (e.g THX Cinema), (v) Wide Screen, (vi) Super Stadium, (vii) Rock Arena, (viii) Jazz Club, (ix) Classic Concert, (x) Mono Movie, (xi) Matrix, (xii) 5-Channel Stereo, (xiii) 7Channel Stereo, (xiv) Stereo, (xv) Pure Direct, (xvi) Direct or xvii Cinema.

These play modes (and others that may be defined) may be used with media receivers (e.g. media receiver 38) that are able to interpret these play modes and configure characteristics about the receiver to play the media. Configurable characteristics include tone settings, equalization (e.g. equalizer settings), level adjustments (e.g. input level, or speaker level), delay time, noise reduction, bass setting, and a balance setting. Other examples of configurable characteristics are also possible.

In a preferred embodiment, the media management system 10 couples a control signal 50 to the media receiver 38 to communicate configuration instructions for playing a particular media unit. The control signal 50 may communicate commands to configure the receiver 38. The commands may be specific to the type (brand or make) of receiver based on the receiver's command set. For example, the media receiver 38 may be a Denon or Marantz receiver that may be controlled by the control signal 50. Examples of Denon receivers that may be controlled by the control signal 50 include:

AVR-2803
AVR-3803
AVR-4802R
AVR-5803

Examples of Marantz receivers that may be controlled by the control signal 50 include:

SR7300
SR7300se
SR8200
SR8300
SR9300

These Denon and Marantz receivers are controlled using an RS232 connection for the control signal 50. However, other receivers and other types of control connections may be used as well.

In exemplary embodiments, the media management system 10 configures the media receiver 38 to play media using a selected receiver connection. The selected receiver connection is used to configure the receiver 38 by ensuring that the media is communicated on the receiver connections that correspond to the media type (e.g. encoding format such as MP3, SACD, DVD-Audio, FLAC, AAC, etc.). In exemplary embodiments, the user is provided with the configuration process 17 to configure how media will be played automatically as a function of its media type and/or genre, artist, or any other suitable characteristic that may be included in the media unit record.

2. An Exemplary Configuration Process

Figure 2:
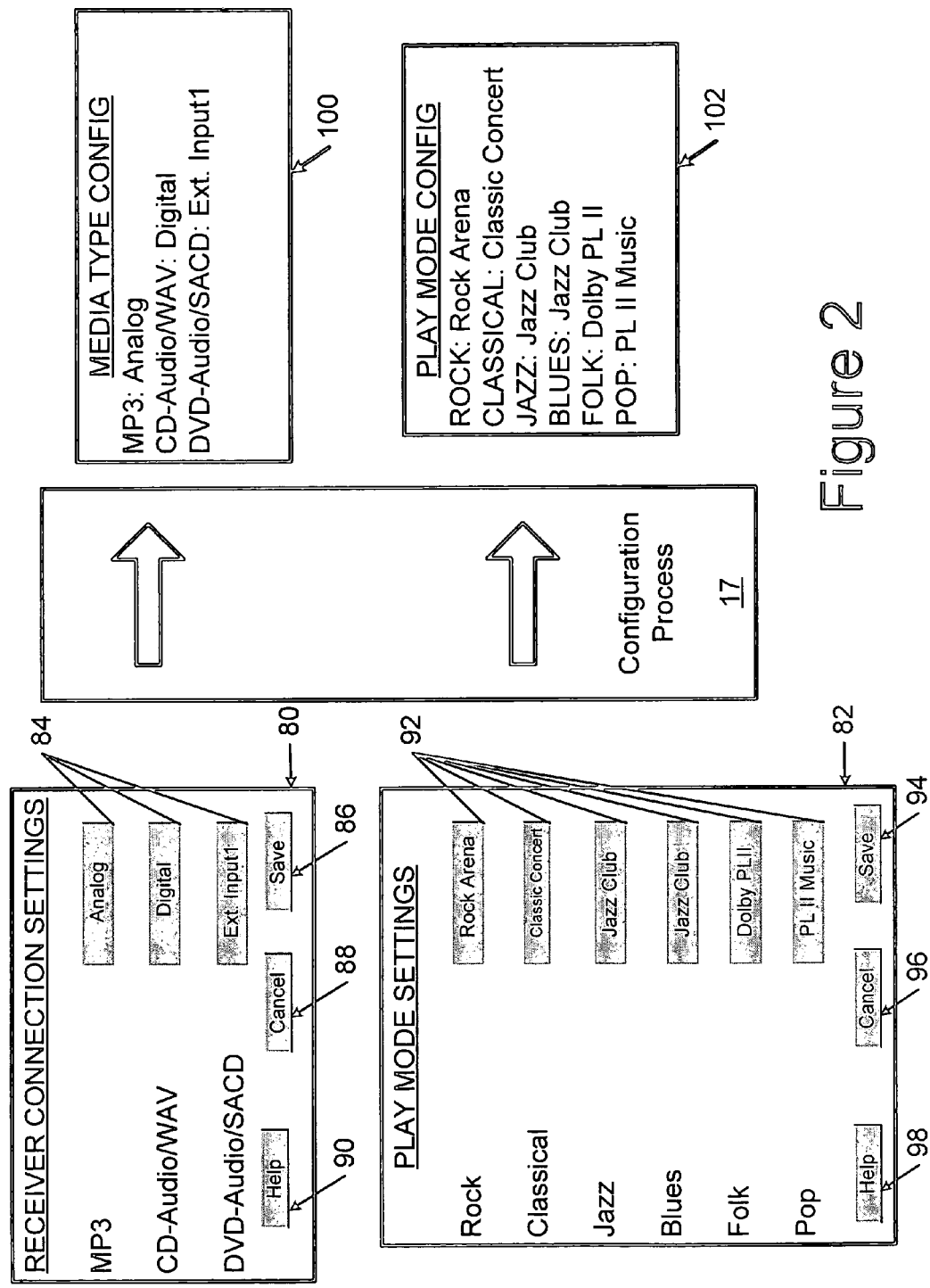
FIG. 2 is a block diagram illustrating an exemplary configuration process.

FIG. 2 depicts operation of an exemplary configuration process 17 that may be used in the media management system 10 shown in FIG. 1. The configuration process 17 is preferably invoked during a setup stage during which the user configures the media management system 10 for operation. During the setup stage, the user may connect all of the necessary equipment to the media management system 10 and go through various interactive stages of inputting information to enable the media management system 10 to perform its functions. For example, one interactive stage may entail setting up service with an Internet Service Provider to be able to communicate with a web-site that provides media to download.

In the configuration process 17 in FIG. 2, the user may enter a receiver configuration stage involving a receiver connection setting screen 80 and a play mode setting screen 82. Referring to the receiver connection setting screen 80, the user may select receiver connections from drop-down menus 84 for each media type listed. The user may then save the selections to a media type configuration record 100 by clicking on a 'SAVE' button 86. The user may click a 'Cancel' button 88 to start again, or a 'Help' button 90 to get interactive help services. The user may also select play modes from drop-down menus 92 on the play mode setting screen 82. As an example, the play modes may be correlated with a particular genre (or another one of the plurality of characteristics) of the media units available for play by the media receiver 38. The user may save play mode selections to a play mode record 102 by clicking on the 'SAVE' button 94.

Those of ordinary skill in the art will appreciate that the receiver connection setting screen 80 and the play mode setting screen 82 are shown as examples of configuration screens that a user may use to select how the media receiver 38 will be automatically configured to play a selected media unit. The play mode setting screen 82 may use other characteristics, such as artist, title, or location, to select the play that will be used by the media receiver 38 when playing the selected media unit. Other examples of the receiver connection setting screen 80 and/or the play mode setting screen 82 are also possible.

3. An Exemplary System and Method for Playing Media

Figure 3:
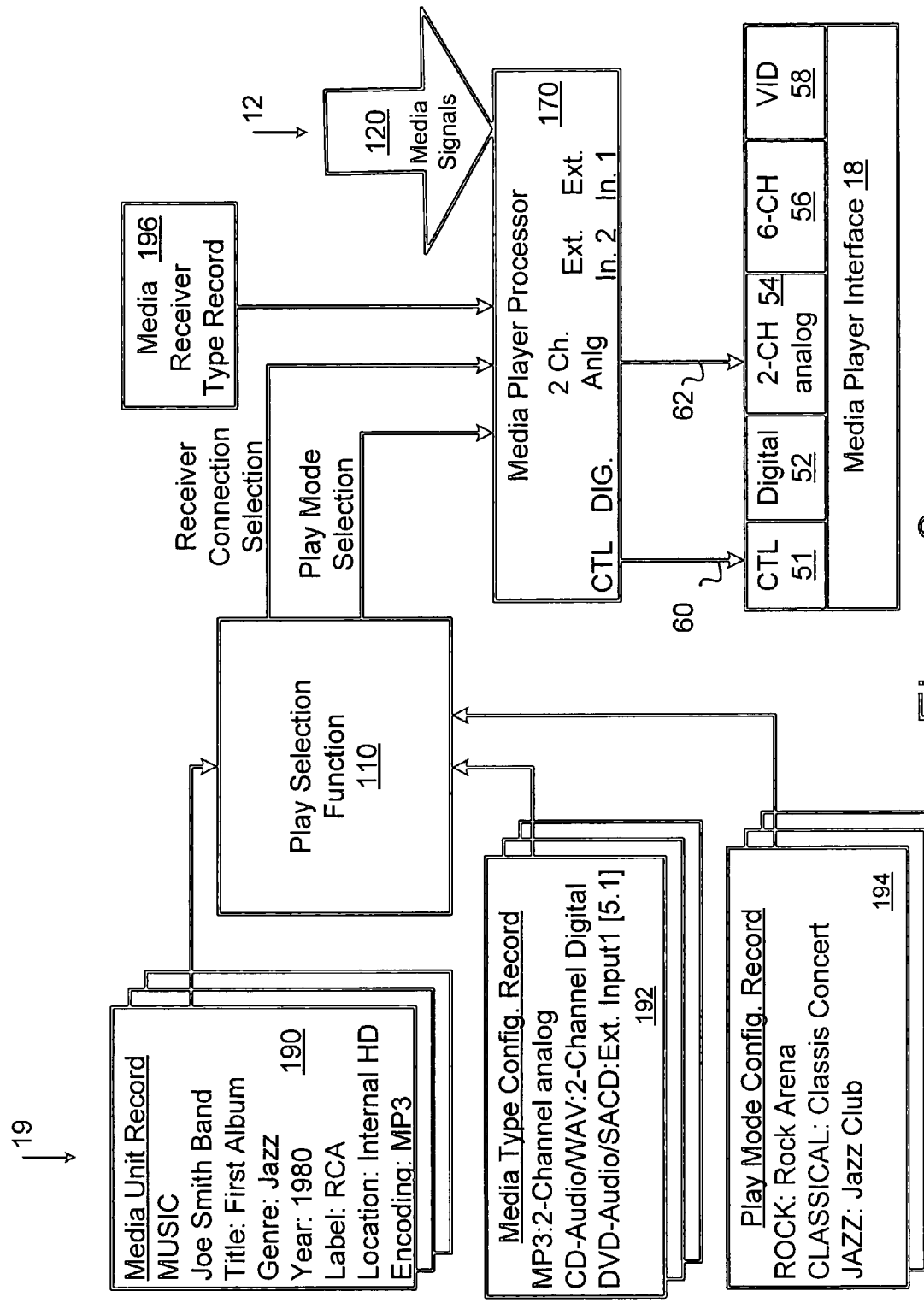
FIG. 3 is a block diagram illustrating an exemplary system and method for playing media in accordance with a user configuration.

FIG. 3 depicts operation of a system in the media management system 10 for automatically selecting a play mode and a receiver connection for configuration of the media receiver 38. Various events and/or timing may be used to trigger the automatic selection of a play mode and receiver connection. For example, the automatic selection may occur in response to installing a disc into a disc player, such as the first CD changer 26a, shown in FIG. 1. As another example the automatic selection may occur in response to receiving a stream of media from a data storage device. In this regard, the data storage device could be local to the media management system 10 or remote from the media management system, such as at a data storage device at the personal computer 24 or on the Internet 20. Other examples of triggering the automatic selection of a play mode and receiver connection are also possible.

As shown in FIG. 3, the system comprises a media player interface 18, a play selection function 110, a media play processor 170, a media unit record 190, a media type configuration record 192, a play mode record 194, and a media receiver type record 196. The media unit record 190, the media type configuration record 192, the play mode record 194, and the media receiver type record 196 may be stored in the media database 19 (shown in FIG. 1). Further, the system may comprise a plurality of media unit records, each corresponding to a particular media unit. Further still, the system may include a plurality of media type configuration records, play mode records, and media receiver type records, such as to accommodate the preferences of more than one user of the system.

The play selection function 110 may retrieve one or more records from the media data base 19. For example, the play selection function 110 retrieves a media unit record 190 from the media database 19 for a selected media unit. The media unit may be selected directly when the user selects the media unit from the user interface. The media unit may also be selected as part of a playlist that contains the name of the media unit and retrieves the information while processing the songs on the playlist. The playlist may be user defined or pre-defined in an album or other type of collection of media units.

Moreover, retrieval of a media unit record may occur in response to another function. For example, retrieval of the media unit record may occur in response to loading a disc into a disc player. As another example, retrieval of the media unit record may occur in response to receiving a stream of data from a data storage device.

The media unit record 190 contains information about the media unit that has been selected for play. As an example, the media unit record 190 may include information that identifies (i) a media unit as an audio (music) or a video media unit, (ii) an artist name, such as "Joe Smith" (iii) a title, such as "Joe Smith's First Album" (iv) a genre, (v) a date, such as a recording date, (vi) a label, such as Radio Corporation of America (RCA), (vii) a location, such as an internal hard drive in a personal computer, and (viii) a media type, such as MP3. Other examples of information in a media unit record 190 are also possible.

As another example, the play selection function 110 may also retrieve a media type configuration record 192, which may be configured as described above with reference to the media type configuration record 100 in FIG. 2. The play selection function 110 determines the media type for the selected media unit from the media unit record 190. In the example shown in FIG. 3, the media type is MP3. The play selection function 110 then determines a receiver connection selection for the selected media type by reference to the media type record 192.

For instance, the receiver connection shown in the media type configuration record 192 for MP3 is 2-Channel Analog. As additional examples, if the media type is CD-audio or a WAV file, then the receiver connection is 2-channel digital, or if the media type is DVD-audio or SACD, then the receiver connection is the analog 5.1 connection. Other examples of receiver connections identified in the media type configuration record 192 are also possible.

As another example, the play selection function 110 may retrieve a play mode record 194. The play mode record 194 includes play modes that correspond to a genre characteristic of a media unit. As an example, a play mode "rock arena" corresponds to a rock genre, a play mode "classic concert" corresponds to a classical genre, and a play mode "jazz club" corresponds to a jazz genre. As another example, a user may select a play mode "rock arena" for a jazz genre. Other examples of play modes corresponding to a characteristic of a media unit are also possible.

The play selection function 110 determines a play mode selection based on the media unit record 190 and the play mode record 194. For instance, since the genre characteristic of the media unit record 190 is Jazz and the play mode for the Jazz genre is Jazz Club (as defined by the play mode record 194), the play selection function 110 determines the play mode selection as being Jazz Club.

The play selection function 110 interfaces to a media play processor 170 to communicate the play mode selection and the receiver connection selection for a selected media unit. The media play processor 170 receives the play mode selection, the receiver connection selection, as well as a media receiver type record 196. The media receiver type record 196 identifies the type of receiver coupled to a media management system. For example, the media receiver type record 196 may identify a receiver as being a Denon brand receiver having a model number of AVR-2803. The receiver connection selection may be based on the media receiver type record.

The media play processor 170 receives the media signals 120 of the selected media unit from the media source I/O ports 12 shown in FIG. 1. The media play processor 170 uses the receiver connection selection and the media receiver type record to determine the selected receiver connection and to couple the media signals 120 to the selected receiver connections at the media player interface 18. The media play processor 170 uses the play mode selection, the receiver connection selection, and the media receiver type record to determine which instructions to send the media receiver 38 for configuration of the media receiver 38.

In one exemplary embodiment, the media play processor 170 communicates a control signal 60 to the control signal connection 51, for transmission in turn to the media receiver 38. The control signal 60 communicates a control instruction to the media receiver 38 that instructs the media receiver 38 to use a particular receiver connection and one of a plurality of play modes in accordance with the instruction. For example, the media play processor 170 may request that the media receiver 38 use a play mode called "Rock Arena." The media receiver 38 would be capable of using various specific settings of characteristics such as tone, equalizer settings, noise reduction, delay time, bass setting, balance setting, and level adjustments to output sound in a manner that may be characterized as sounding like "Rock Arena." The media receiver 38 would also be compatible with the control instruction it receives.

As another example, the media play processor 170 may request that the media receiver 38 switch an input source for media signals to a particular receiver connection. In this regard, the media play processor 170 requests the media receiver 38 to use receiver connections of the media receiver that are coupled to receiver connections at the media player interface 18. For example, the media play processor 170 may request the media receiver to use a 2-channel analog receiver connection that is coupled to the 2-channel analog connection 54. In this regard, the media play processor 170 will route the media signals 120 to the 2-channel analog connection 54 as 2-channel analog signals 62, for transmission in turn to the 2-channel analog receiver connection at the media receiver 38. Other signals that may be sent by the media play processor 170 are signals sent to the digital connection 52, the 6-channel analog connection 56, or the video connection 58. These signals are not shown for clarity of the example above.

Specific media receivers are already capable of such functionality. Tables 1-10 contain categories of control instructions and other information that may be communicated to the media receiver 38 on a control signal 50 to configure the media receiver 38. The control instructions in Tables 1-10 are for a Denon AVR-SR9200. Those of ordinary skill in the art will appreciate that Tables 1-10 shows just one example of the types of control instructions that may be defined for other media receivers.

TABLE 1

Normal Command List

|  | Command | Priority | Character | (Sample Command ID = 1) Sample |
|---|---|---|---|---|
| Power | Power | LOW | A0 | "@1A0",0x0D |
|  | Power ON | HIGH | A1 |  |
|  | Power OFF | HIGH | A2 |  |
| INPUT | DSS | HIGH | B0 |  |
|  | TV | HIGH | B1 |  |
|  | LD | HIGH | B2 |  |
|  | DVD | HIGH | B3 |  |
|  | VCR1 | HIGH | B4 |  |
|  | VCR2/DVD-R | HIGH | B5 |  |
|  | AUX1 | HIGH | B6 |  |
|  | AUX2 | HIGH | B7 |  |
|  | DVD-R (Not useable in this Model) | — | B8 |  |
|  | CD | HIGH | B9 |  |
|  | TAPE | HIGH | BA |  |
|  | CD-R | HIGH | BB |  |
|  | FM | HIGH | BC |  |
|  | AM | HIGH | BD |  |
|  | MW (Same as AM) | HIGH | BE |  |
|  | LW | HIGH | BF |  |
|  | TUNER | HIGH | BG |  |
| MULTI CHANNEL | M-ch. INPUT ON | HIGH | BH |  |
|  | M-ch. INPUT OFF | HIGH | BI |  |
| INPUT SIGNAL | A_D | HIGH | BJ |  |
| TUNNER FREQ | AUTO-TUNE | HIGH | C0 |  |
|  | FREQ UP | HIGH | C1 |  |
|  | FREQ DOWN | HIGH | C2 |  |
| TUNNER PRESET | PRISET INFO | LOW | C3 |  |
|  | P-SCAN | LOW | C4 |  |
|  | PRESET UP | HIGH | C5 |  |
|  | PRESET DOWN | HIGH | C6 |  |
| F-DIRECT | F-DIRECT | LOW | C7 |  |
| TUNER MODE | T-MODE | LOW | C8 |  |
| MEMO/CLR | CLR | LOW | D0 |  |
|  | MEMO | LOW | D1 |  |
| DIRECT KEY | DIRECT KEY 0 | LOW | E0 |  |
| (10 Key) | DIRECT KEY 1 | LOW | E1 |  |
|  | DIRECT KEY 2 | LOW | E2 |  |
|  | DIRECT KEY 3 | LOW | E3 |  |
|  | DIRECT KEY 4 | LOW | E4 |  |
|  | DIRECT KEY 5 | LOW | E5 |  |
|  | DIRECT KEY 6 | LOW | E6 |  |
|  | DIRECT KEY 7 | LOW | E7 |  |
|  | DIRECT KEY 8 | LOW | E8 |  |
|  | DIRECT KEY 9 | LOW | E9 |  |

TABLE 2

|  | Command | Priority | Character | Sample |
|---|---|---|---|---|
| SURROUND | AUTO | HIGH | F0 | "@1F0",0x0D |
| MODE | THX 5.1MUSIC | HIGH | F1 |  |
|  | THX SURR EX | HIGH | F2 |  |
|  | THX CINEMA | HIGH | F3 |  |
|  | DTS | HIGH | F4 |  |
|  | DTS ES | HIGH | F5 |  |
|  | DOLBY | HIGH | F6 |  |
|  | DOLBY PROLOGIC | HIGH | F7 |  |
|  | DOLBY PRO LOGIC II MOVIE | HIGH | F8 |  |
|  | DOLBY PRO LOGIC II MUSIC | HIGH | F9 |  |
|  | VIRTUAL | HIGH | FA |  |
|  | S DIRECT | HIGH | FB |  |
|  | MOVIE | HIGH | FC |  |
|  | HALL | HIGH | FD |  |
|  | MATRIX | HIGH | FE |  |
|  | Mch-STEREO | HIGH | FF |  |
|  | STEREO | HIGH | FG |  |
|  | MONO | — | FH |  |

TABLE 2-continued

|  | Command | Priority | Character Sample |
|---|---|---|---|
|  | NEO6 CINEMA | HIGH | FI |
|  | NEO6 MUSIC | HIGH | FJ |
|  | THX Adv EX | HIGH | FK |
|  | CS5.1 MUSIC | HIGH | FL |
|  | C55.1 CINEMA | HIGH | FM |
|  | SURR MODE | HIGH | FN |
| VOLUME | VOLUME UP(SLOW) | HIGH | G0 |
|  | VOLUME DOWN(SLOW) | HIGH | G1 |
|  | VOLUME UP(FAST) | HIGH | G2 |
|  | VOLUME DOWN(FAST) | HIGH | G3 |
| TONE | BASS UP | HIGH | G0 |
|  | BASS DOWN | HIGH | G1 |
|  | TREBLE UP | HIGH | G2 |
|  | TREBLE DOWN | HIGH | G3 |
| SLEEP MODE | SLEEP | HIGH | H0 |
| MUTE | MUTE OFF | LOW | H1 |
|  | MUTE ON | LOW | H2 |
| VIDEO MUTE | VIDEO MUTE | LOW | H3 |
| ATT | ATT | LOW | H4 |
| TEST TONE | TEST TONE | LOW | I0 |
| NIGHT | NIGHT ON/OFF | LOW | J0 |

TABLE 3

|  | Command | Priority | Character | Sample |
|---|---|---|---|---|
| DISPLAY OFF | DISP | LOW | J1 | "@1S0",0x0D |
| OSD | OSD | LOW | J2 |  |
| MENU | MENU (OK) | HIGH | J3 |  |
|  | MENU OFF | HIGH | J4 |  |
| CURSOL | CURSOL UP | HIGH | J5 |  |
|  | CURSOL DOWN | HIGH | J6 |  |
|  | CURSOL LEFT | HIGH | J7 |  |
|  | CURSOL RIGHT | HIGH | J8 |  |
| RDS | RDS DISP MODE | LOW | J9 |  |
|  | RDS PTY | LOW | JA |  |
| VR VAL RESET | V RESET | LOW | JB |  |
| RE-EQ | RE-EQ | LOW | JC |  |
| CH SELECT | CH SEL | LOW | JD |  |
| CH LEVEL | CH LEVEL UP | LOW | JE |  |
|  | CH LEVEL DOWN | LOW | JF |  |
| SELECT | SELECT | LOW | JG |  |
| ENTER | ENTER | LOW | JH |  |
| UP/DOWN | UP>> | LOW | JI |  |
|  | DOWN<< | LOW | JK |  |

TABLE 4

Special Command List

|  | Command | Priority | Character | Sample |
|---|---|---|---|---|
| MULTI | MULTI ROOM OFF | LOW | L0 | "@1L0",0x0D |
|  | MULTI ROOM ON | LOW | L1 |  |
| MUTE (MULTI) | MULTI ROOM MUTE | LOW | L2 |  |
| VOLUME (MULTI) | MULTI VOLUME UP(SLOW) | LOW | M0 |  |
|  | MULTI VOLUME DOWN(SLOW) | LOW | M1 |  |
|  | MULTI VOLUME UP(FAST) | LOW | M2 |  |
|  | MULTI VOLUME DOWN(FAST) | LOW | M3 |  |
| SLEEP MODE (MULTI) | MULTI SLEEP | — | N0 |  |
| MULTI SPEAKER | MULTI SPEAKER ON | LOW | N1 |  |
|  | MULTI SPEAKER OFF | LOW | N2 |  |
| MULTI INPUT | MULTI INPUT ON | LOW | N3 |  |
|  | MULTI INPUT OFF | LOW | N4 |  |

TABLE 5

|  | Command | Priority | Character | Sample |
|---|---|---|---|---|
| CONNECTION | ON | HIGH | P0 | — |
|  | OFF | HIGH | P1 | — |

TABLE 6

Request Status Command (Status Command) List

| Request Status | Request Command | Answer | Character |
|---|---|---|---|
| Power Status | "@1?A",0x0D | Power ON | A0 ("@1A0",0x0D) |
|  |  | Power OFF | A1 |
|  |  | NON | A- |
| Video IN | "@1?B",0x0D | DSS | B0 |
|  |  | TV | B1 |
|  |  | LD | B2 |
|  |  | DVD | B3 |
|  |  | VCR-1 | B4 |

TABLE 6-continued

Request Status Command (Status Command) List

| Request Status | Request Command | Answer | Character |
|---|---|---|---|
| | | VCR-2 | B5 |
| | | AUX1 | B6 |
| | | DVD-R | B7 |
| | | NON | B- |
| Audio IN | "@1?C",0x0D | DSS | C0 |
| | | TV | C1 |
| | | LD | C2 |
| | | DVD | C3 |
| | | VCR-1 | C4 |
| | | VCR-2/DVD-R | C5 |
| | | AUX1 | C6 |
| | | AUX2 | C7 |
| | | DVD-R (Not usable) | C8 |
| | | CD | C9 |
| | | TAPE | CA |
| | | CD-R | CB |
| | | FM | CC |
| | | AM | CD |
| | | MW | CE |
| | | LW | CF |
| | | Mch INPUT | CG |
| | | TUNER | CH |
| | | NON | C- |
| Input Mode | "@1?D",0x0D | DIGIAL | D0 |
| | | ANALOGUE | D1 |
| | | NON | D- |
| Tuner Frequency | "@1?E",0x0D | XXXX (76.0-108.0)FM (153-1602)AM | E0XXXX |
| | | NON | E- |
| Tuner Preset | "@1?F",0x0D | PXX(Preset1~50) | F0XX |
| | | NON | F- |
| Tuner mode | "@1?G",0x0D | AUTO STEREO | G0 |
| | | MONO | G1 |
| | | NON | G- |
| VOLUME Status | "@1?H",0x0D | VOL XXXdB(-90~+99) | H0XXX |
| | | max | H1 |
| | | min (∞) | H2 |
| | | NON | H- |
| Bass Status | "@1?I",0x0D | BASSXXdB(-9~+9) | I0XX |
| | | NON | I- |
| Treble Status | "@1?J",0x0D | TREBLEXXdB(-9~+9) | J0XX |
| | | NON | J- |
| ATT | "@1?K",0x0D | ATT ON | K0 |
| | | ATT OFF | K1 |
| | | NON | K- |

TABLE 7

| Request Status | Request Command | Answer | Sample |
|---|---|---|---|
| SURROUND MODE | "@1?L",0x0D | AUTO | L0 ("@1L0",0x0D) |
| | | THX 5.1 | L1 |
| | | THX SURR EX | L2 |
| | | THX CINEMA | L3 |
| | | THX MUSIC | L4 |
| | | DTS MUSIC | L5 |
| | | DTS CINEMA | L6 |
| | | DTS ES | L7 |
| | | NEO 6 | L8 |
| | | NEO 6 MUSIC | L9 |
| | | D DIGITAL | LA |
| | | DD PRO LOGIC | LB |
| | | DD PRO LOGIC II MOVIE | LC |
| | | DD PRO LOGIC II MUSIC | LD |
| | | CS CINEMA | LE |
| | | CS MUSIC | LF |
| | | VIRTUAL | LG |
| | | S DIRECT | LH |
| | | MOVIE | LI |
| | | HALL | LJ |
| | | MATRIX | LK |
| | | Mch-STEREO | LL |
| | | STEREO | LM |
| | | MONO | LN |
| | | NON | L- |
| SLEEP Status | "@1?M",0x0D | SLEEP OFF | M0 |
| | | SLEEP XXX(1~120) | M1XXX |
| | | NON | M- |
| DISP Status | "@1?N",0x0D | DISPLAY ON | N0 |
| | | DISPLAY OFF | N1 |
| | | NON | N- |
| OSD Status | "@1?O",0x0D | OSD ON | O0 |
| | | OSD OFF | O1 |
| | | NON | O- |
| TEST TONE | "@1?P",0x0D | TEST TONE L | P1 |
| | | TEST TONE C | P2 |
| | | TEST TONE R | P3 |

TABLE 7-continued

| Request Status | Request Command | Answer Sample | |
|---|---|---|---|
| | | TEST TONE SR | P4 |
| | | TEST TONE SBR | P5 |
| | | TEST TONE SBL | P6 |
| | | TEST TONE SL | P7 |
| | | TEST TONE SW | P8 |
| | | TEST TONE ALL | P9 |
| | | TEST TONE OFF | P0 |
| | | NON | P- |
| TEST TONE MODE | "@1?Q",0x0D | TEST TONE AUTO | Q0 |
| | | TEST TONE MANUAL | Q1 |
| | | NON | Q- |
| NIGHT MODE | "@1?R",0x0D | NIGHT MODE ON | R0 |
| | | NIGHT MODE OFF | R1 |
| | | NON | R- |
| MENU | "@1?S",0x0D | MENU ON | S0 |
| | | MENU OFF | S1 |
| | | NON | S- |

TABLE 8

| Request Status | Request Command | Answer Sample | |
|---|---|---|---|
| F-DIRECT | "@1?T",0x0D | F-DIRECT ON | T0 |
| | | F-DIRECT OFF | T1 |
| | | NON | T- |
| P-FORMAT | "@1?U",0x0D | D DIGITAL(AC-3) | U0 |
| | | DD SURROUND | U1 |
| | | DD SURR EX | U2 |
| | | DTS | U3 |
| | | DTS ES | U4 |
| | | AAC | U5 |
| | | MPEG | U6 |
| | | MLP | U7 |
| | | PCM | U8 |
| | | HDCD | U9 |
| | | DSD | UA |
| | | OTHER | UB |
| | | NON_DETECTION | UC |
| | | NON | U- |
| SAMPLING FREQ FS | "@1?V",0x0D | 32K | V0 |
| | | 44.1K | V1 |
| | | 48K | V2 |
| | | 88.2K | V3 |
| | | 96K | V4 |
| | | 176.4K | V5 |
| | | 192K | V6 |
| | | OUT OF RANGE | V7 |
| | | NON | V- |
| ☐Channel Status | "@1?W",0x0D | XX(Bit 6-01: on 0: off) | WXX |
| | | NON | W- |

TABLE 10

| Request Status | Request Command | Answer Sample | |
|---|---|---|---|
| Multi Room Status | "@1X?",0x0D | Power ON | X0 |
| | | OFF | X1 |
| | | NON | X- |
| Video IN(MR) | "@1?Y",0x0D | DSS | Y0 |
| | | TV | Y1 |
| | | LD | Y2 |
| | | DVD | Y3 |
| | | VCR1 | Y4 |
| | | VCR2/DVD-R | Y5 |
| | | AUX1 | Y6 |
| | | DVD-R | Y7 |
| | | NON | Y- |
| Audio IN(MR) | "@1?Z",0x0D | DSS | Z0 |
| | | TV | Z1 |
| | | LD | Z2 |
| | | DVD | Z3 |
| | | VCR1 | Z4 |
| | | VCR2/DVD-R) | Z5 |
| | | AUX1 | Z6 |
| | | AUX2 | Z7 |
| | | CD | Z9 |
| | | TAPE | ZA |
| | | CD-R | ZB |
| | | MD | ZC |
| | | FM | ZD |
| | | AM | ZE |
| | | MW | ZF |
| | | LW | ZG |
| | | TUNER | ZH |

TABLE 9

"ON/OFF" information is indicated "Bit" by 'Bit'.

```
Bit   7   6   5   4   3   2   1   0
      1  LFE  S   S   S   L   R   C         L        C        R

7: NOT USED   1   1
   6: LFE        1   0
   5: SL         1   0                   LFE
   4: SR         1   0
   3: S          1   0
   2: L          1   0
   1: R          1   0                    SL        S        S
   0: C          1   0
```

TABLE 10-continued

| Request Status | Request Command | Answer Sample | |
|---|---|---|---|
| Tuner Frequency (MR) | "@1?a",0x0D | NON<br>XXXX(76.0-108.0) FM (153-1602) AM | z-<br>a0XXXX |
| Tuner Preset (MR) | "@1?b",0x0D | NON<br>PXX(Preset1~50,255) | a-<br>b0XX |
| VOLUME Status(MR) | "@1?c",0x0D | NON<br>VOL XXX(-90~+99)<br>max<br>min (∞) | b-<br>c0XXX<br>c1<br>c2 |
| Volume Set Status (MR) | "@1?d",0x0D | NON<br>Variable<br>Fixed | c-<br>d0<br>d1 |
| SLEEP Status(MR) | "@1?e",0x0D | NON<br>SLEEP OFF<br>SLEEP XXX(1~120) | d-<br>e0<br>e1XXX |
| MULTI OSD | "@1?f",0x0D | NON<br>MULTI OSD ON<br>MULTI OSD OFF | e-<br>f0<br>f1 |
| MULTI SPEAKER | "@1?g",0x0D | NON<br>MULTI SPEAKER ON<br>MULTI SPEAKER OFF | f-<br>g0<br>g1 |
| MUTE (MR) | "@1?h",0x0D | NON<br>MUTE ON (MR)<br>MUTE OFF (MR)<br>NON | g-<br>h0<br>h1<br>h- |

4. Conclusion

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An apparatus for controlling a media receiver having a plurality of receiver connections, the apparatus comprising:
   a media player interface comprising a plurality of output connections for outputting media signals to a corresponding receiver connection of the plurality of receiver connections;
   a user interface for querying a user to associate each encoding format of a plurality of encoding formats with a receiver connection of the plurality of receiver connections;
   a media database comprising (i) media unit data that identifies an encoding format of each playable piece of media of a plurality of playable pieces of media, and (ii) receiver connection data that identifies the receiver connection associated with each of the encoding formats; and
   a processor for interfacing to a play selection function that (i) determines from the media unit data an encoding format of a selected playable piece of media, and (ii) determines from the receiver connection data a receiver connection associated with the encoding format of the selected media,
   wherein the processor (i) sends to the media receiver a control signal instructing the media receiver to use the receiver connection associated with the encoding format of the selected media for receiving a media signal of the selected media, and (ii) outputs the media signal of the selected media to the receiver connection associated with the encoding format of the selected media.

2. The apparatus of claim 1, further comprising:
   a play mode record stored in the media database,
   wherein the play selection function (i) retrieves the play mode record for the selected media from the media database, and (ii) determines a play mode selection for the selected media based on at least one characteristic of the selected media and the play mode record, and
   wherein the processor requests the media receiver to play the selected media according to the play mode selection.

3. The apparatus of claim 2, wherein the at least one characteristic is selected from the group consisting of: a title, a song, a genre, a location, a label, an artist, an encoding format, and a date.

4. The apparatus of claim 2, wherein the play mode selection is for a play mode selected from the group consisting of: rock arena, jazz club, classic concert, mono movie, matrix, 5-channel stereo, 7-channel stereo, stereo, pure direct, direct, super stadium, wide screen, cinema, Dolby Digital, Dolby Pro Logic, Digital Theater System, and THX.

5. The apparatus of claim 2, wherein the play mode selection defines one or more media receiver settings selected from the group of consisting of: tone settings, equalization settings, noise reduction settings, level adjustment settings, balance settings, delay time settings, and bass settings.

6. The apparatus of claim 2, further comprising:
   a user interface for correlating the play mode selection for the selected media with the at least one characteristic of the selected media,
   wherein the at least one characteristic is selected from the group consisting of: a title, a
   song, a genre, a location, a label, an artist, an encoding format, and a date.

7. The apparatus of claim 1, wherein the encoding format of the selected media is an encoding format selected from the group consisting of: motion picture experts group—audio layer 3 (MP3), compact disc (CD), digital versatile disc audio (DVD-audio), DVD-movie, super audio CD (SACD), pulse code modulation (PCM), free lossless audio codec (FLAC), advanced audio coding (AAC), and waveform audio format (WAV).

8. The apparatus of claim 1, further comprising:
   a media receiver type record stored in the media database, wherein the media receiver type record identifies the media receiver, and wherein the receiver connection is further based on the media receiver type record.

9. The apparatus of claim 1, further comprising:
   a media type configuration record stored in the media database, wherein the play selection function retrieves the media type configuration record to determine the receiver connection.

10. The apparatus of claim 1, wherein the encoding format of the selected media consists of an encoding format selected from the group consisting of: compressed media, uncompressed media, and a combination of compressed and uncompressed media.

11. The apparatus of claim 1, wherein the encoding format of the selected media consists of an encoding format selected from the group consisting of encrypted media and unencrypted media.

12. The apparatus of claim 1, wherein the receiver connection associated with the encoding format of the selected media is a connection selected from the group consisting of: (i) a digital connection, and (ii) an analog connection.

13. The apparatus of claim 1, further comprising:
   a user interface for choosing the selected media.

14. An apparatus for controlling a media receiver, the apparatus comprising:
a media player interface comprising a plurality of output connections for outputting media signals to the media receiver;
a user interface for querying a user to associate each characteristic of a plurality of media characteristics with a play mode of a plurality of play modes;
a media database comprising (i) media unit data that identifies at least one characteristic of a selected piece of media playable by the media receiver, an encoding format of the selected media, and a receiver connection associated with the encoding format of the selected media, and (ii) a play mode record that identifies a play mode corresponding to the at least one characteristic of the selected media; and
a processor for interfacing to a play selection function to (i) determine from the media unit data the at least one characteristic of the selected media, the encoding format of the selected media, and the receiver connection associated with the encoding format of the selected media, (ii) determine a receiver connection selection based on the selected media and a media type configuration record, wherein the receiver connection selection is communicated to the processor from the play selection function, and (iii) determine from the play mode record the play mode corresponding to the at least one characteristic of the selected media,
wherein the processor sends to the media receiver a control signal instructing the media receiver to play the selected media according to the play mode and to use the receiver connection associated with the encoding format of the selected media for receiving a media signal of the selected media, and
wherein the processor outputs the media signal of the selected media to the receiver connection associated with the encoding format of the selected media.

15. The apparatus of claim 14, wherein the receiver connection associated with the encoding format of the selected media comprises a connection selected from the group consisting of a digital connection and an analog connection.

16. The apparatus of claim 14, further comprising:
a media receiver type record stored in the media database, wherein the media receiver type record identifies the media receiver, and wherein the receiver connection selection is further based on the media receiver type record.

17. The apparatus of claim 14, wherein the user interface queries the user to associate each encoding format of a plurality of encoding formats with a receiver connection of a plurality of receiver connections.

18. A method for controlling a receiver having a plurality of receiver connections, the method comprising:
querying a user to select a receiver connection of the plurality of receiver connections to correspond with each encoding format of a plurality of encoding formats;
retrieving media unit data that identifies an encoding format of a playable piece of media selected to be played by the receiver, wherein the identified encoding format is one of the plurality of encoding formats;
retrieving receiver-connection data that identifies the receiver connection corresponding with the identified encoding format; and
sending to the receiver a control signal instructing the receiver to use the identified receiver connection for receiving a media signal of the selected media.

19. The method of claim 18, further comprising:
retrieving play mode data that correlates a particular play mode with a particular characteristic identified in the media unit data, and
requesting the receiver to play the media unit according to the particular play mode.

20. The method of claim 19, further comprising:
querying a user to select the particular play mode from a plurality of play modes to correspond to the particular characteristic.

21. The method of claim 20, further comprising:
continuing to query the user to select a play mode from the plurality of play modes until each of a plurality of characteristics is correlated with one of play mode of the plurality of play modes.

22. The method of claim 21, further comprising:
displaying the query on a display terminal; and
storing in the play mode data the selected play modes corresponding to each of the plurality of characteristics.

23. The method of claim 19, wherein the particular play mode is a mode selected from the group consisting of: rock arena, jazz club, classic concert, mono movie, matrix, 5-channel stereo, 7-channel stereo, stereo, pure direct, direct, super stadium, wide screen, cinema, Dolby Digital, Dolby Pro Logic, Digital Theater System, and THX.

24. The method of claim 19, wherein the particular play mode defines one or more receiver settings selected from the group of consisting of: tone settings, equalization settings, noise reduction settings, level adjustment settings, balance settings, and delay time settings, and bass settings.

25. The method of claim 18, further comprising:
continuing to query the user to select a receiver connection from among a plurality of receiver connections to correspond to each encoding format of a plurality of encoding formats until each encoding format of the plurality of encoding formats corresponds to a selected receiver connection.

26. The method of claim 25, further comprising:
displaying the query on a display terminal; and
storing the selected receiver connections corresponding to the encoding formats in a media type configuration record.

27. The method of claim 18, wherein the step of retrieving the media unit data occurs in response to loading a disc into a disc player.

28. The method of claim 18, wherein the step of retrieving the media unit data occurs in response to receiving a stream of data from a data storage device.

29. A media management system comprising:
a media port coupled to a media source, wherein the media port receives a media signal of a playable piece of media selected to be played by a media receiver, and wherein the media port receives the media signal from the media source;
a media player interface comprising a plurality of output connections for outputting media signals to a corresponding receiver connection of the media receiver;
a user interface for querying a user to (i) associate one of the receiver connections with an encoding format of the selected media, and (ii) associate a play mode with a characteristic of the selected media;
a media database comprising (i) media unit data that identifies an encoding format and characteristic of the selected media, (ii) receiver connection data that identifies the receiver connection associated with the encoding format of the selected media, and (iii) a play mode record that identifies the play mode associated with the characteristic of the selected media; and a processor for interfacing to a play selection function to determine (i) from the media unit data, the encoding format and characteristic of the selected media, (ii) from the receiver connection data, the receiver connection data associated with the encoding format of the selected media, and (iii) from the play mode record, the play mode associated with the characteristic of the selected media, wherein the processor sends to the media receiver a control signal instructing the media receiver to (i) use the receiver connection associated with the encoding format of the selected media, and (ii) to play the selected media according to the play mode selection.

* * * * *